United States Patent
Tong et al.

(10) Patent No.: US 9,148,719 B2
(45) Date of Patent: Sep. 29, 2015

(54) PORTABLE ELECTRONIC DEVICE

(71) Applicant: HTC Corporation, Taoyuan, Taoyuan County (TW)

(72) Inventors: Hann-Shi Tong, Taoyuan (TW); Chun-Min Lee, Taoyuan (TW); Lei Chen, Taoyuan (TW); Yu-Sheng Lee, Taoyuan (TW); Chih-Chiang Cheng, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 266 days.

(21) Appl. No.: 13/787,540

(22) Filed: Mar. 6, 2013

(65) Prior Publication Data

US 2014/0254836 A1  Sep. 11, 2014

(51) Int. Cl.
*H03F 99/00* (2009.01)
*H04R 1/28* (2006.01)

(52) U.S. Cl.
CPC .......... *H04R 1/2803* (2013.01); *H04R 2499/11* (2013.01)

(58) Field of Classification Search
USPC ........................................................ 381/120
See application file for complete search history.

(56) References Cited

U.S. PATENT DOCUMENTS

| | | |
|---|---|---|
| 4,790,407 A | 12/1988 | Yamamoto et al. |
| 8,184,826 B2 | 5/2012 | Matsumura et al. |
| 2004/0125968 A1 | 7/2004 | Pearce et al. |
| 2007/0127760 A1 | 6/2007 | Saiki et al. |
| 2009/0316920 A1 | 12/2009 | Matsumura et al. |
| 2011/0164767 A1 | 7/2011 | Goel et al. |

FOREIGN PATENT DOCUMENTS

| | | |
|---|---|---|
| TW | 569638 B | 1/2004 |
| TW | 200415845 A | 8/2004 |

*Primary Examiner* — Quynh Nguyen
(74) *Attorney, Agent, or Firm* — Birch, Stewart, Kolasch & Birch, LLP

(57) ABSTRACT

A portable electronic device having a speaker module is provided. The speaker module includes: a speaker unit; a back chamber; a channel coupled between the speaker unit and the back chamber; and a porous material filled inside at least a portion of the front chamber, the back chamber, and/or the channel, for improving and extending bass performance and relieving a channel effect caused by the channel. Moreover, the portable electronic device is advantageously able to compensate a resonance degradation caused by the porous material.

12 Claims, 8 Drawing Sheets

PORTABLE ELECTRONIC DEVICE

BACKGROUND OF THE INVENTION

1. Field of the Invention

The invention relates to a portable electronic device, and more particularly, to a portable electronic device with a speaker module filled with a porous material.

2. Description of the Related Art

In the information age, our reliance on electronic products can be seen everywhere. For example, we use mobile phones, computers and audio-visual products every day. As manufacturing techniques for electronic devices continue to advance, more personalized and multi-functional electronic products are available in the market. With big leaps in communication industry technology, the mobile phone has become increasingly common in our society.

Starting out being bulky and heavy, the first generation of mobile phones has transformed into slim and lightweight phones. Despite, most manufacturers are still researching methods to reduce the weight and size of existing mobile phones for greater portability. In the meantime, manufacturers are also trying hard to expand the function of each mobile phone and reduce as much as possible any harmful effects which may be caused to a user due to electromagnetic radiation. However, reducing the size of an existing mobile phone involves a close matching requirement of all the elements within the mobile phone including the location and size of a speaker box for housing a speaker unit. In fact, quality of sound emitted from the phone largely depends on the size of the speaker box. In general, a larger speaker box can obtain a better sound quality. Nevertheless, due to the miniaturization trend of the hand-held electronic device, a large size speaker box is no longer practical. Hence, how to devise a speaker box that can improve the sound quality while not increasing its size, is an important topic for manufacturers of portable devices. However, when a mobile phone is reduced in size, a speaker box within the mobile phone must be reduced correspondingly. Thus, the frequency response of the speaker module will deteriorate.

BRIEF SUMMARY OF THE INVENTION

Portable electronic devices and a method for operating a portable electronic device are provided. An embodiment of a portable electronic device having a speaker module is provided. The speaker module comprises: a speaker unit; a back chamber; a channel coupled between the speaker unit and the back chamber; and a porous material filled inside at least a portion of the front chamber, the back chamber, and/or the channel, for improving/extending bass performance and relieving a channel effect impact.

Furthermore, another embodiment of a speaker module is provided. An embodiment of a portable electronic device is provided. The portable electronic device comprises: a housing; a speaker module at least partially filled with a porous material; at least one memory; a central processing unit; and a speaker amplifier for receiving the audio input, compensating the audio input according to a first peak and/or a second peak, and producing an audio output to the speaker module.

Moreover, an embodiment of a method operating an electronic portable device having a speaker module at least partially filled with a porous material is provided. The method comprises: requesting to drive the speaker module based on an audio input; predicting a sound pressure level degradation around a resonance frequency caused by the porous material; compensating the audio input according to the predicting by performing look-ahead based inverse compensation; and producing an audio output to drive the speaker module based on the compensating.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
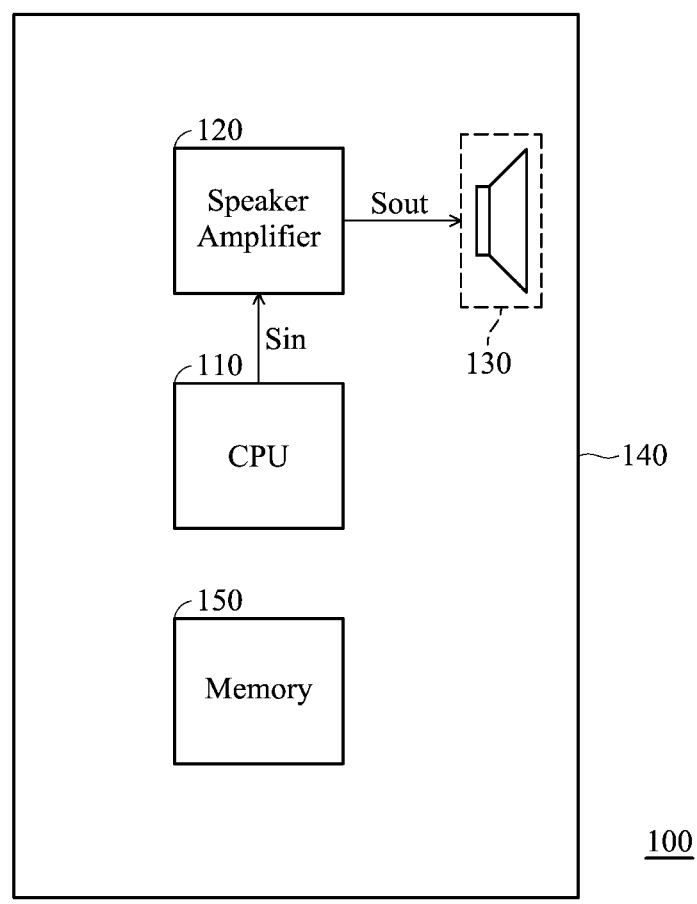
FIG. 1 shows an embodiment of a portable device.
Figure 2:
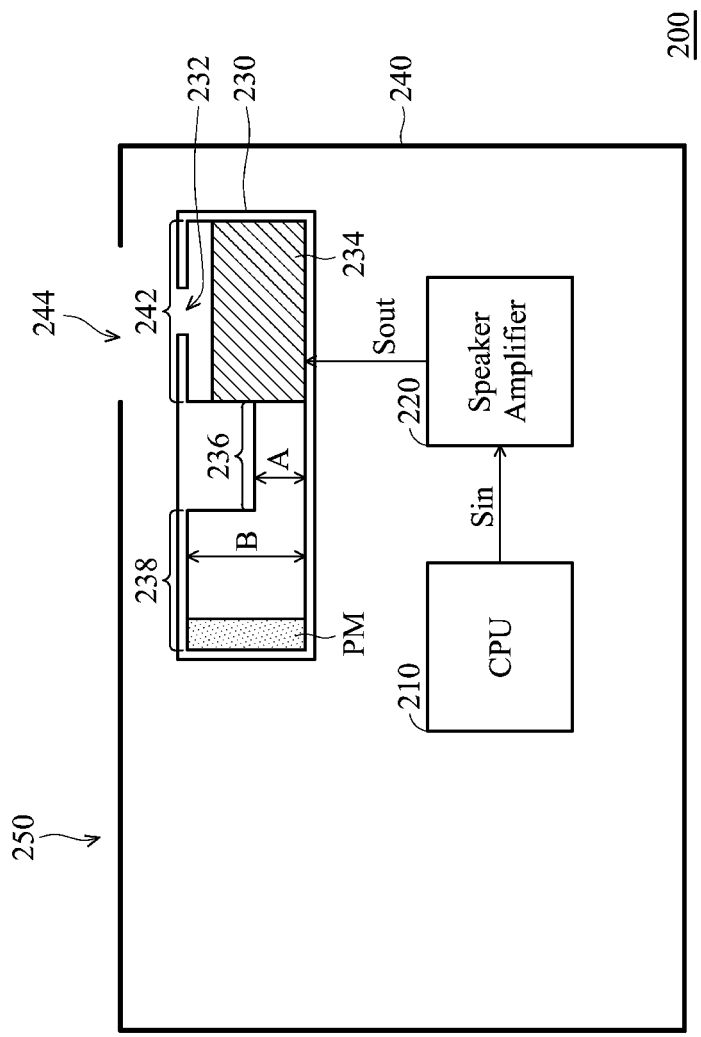
FIG. 2 shows a sectional view of a portable device according to an embodiment of this application.

FIG. 1 shows a portable device 100 according to an embodiment of a playback mechanism. The portable device 100 comprises a central processing unit (CPU) 110, a speaker amplifier 120, a speaker module 130, a housing 140, and at least one memory 150. The at least one memory 150 can comprise a buffer inside and/or outside the CPU 110 and/or speaker amplifier 120, for storing a multimedia file. The CPU 110 is for playing the multimedia file to produce an audio input corresponding the playing of the multimedia file. The CPU 110 provides an input signal Sin as an audio input to the speaker amplifier 120, wherein the input signal Sin is a digital audio signal to be converted into an analog output signal Sout with the speaker amplifier 120, and the output signal Sout is to be driven on the speaker module 130 to produce audible sounds. Since the speaker module is formed in a thin and/or elongated structure, a channel effect may be induced at certain frequency. The speaker module 130 is at least partially filled with a porous material to improve and extend bass performance. Furthermore, the at least one memory 150 stores a first peak corresponding to a resonance frequency and/or a second peak corresponding to a standing wave frequency, wherein the first and second peaks are caused by the porous material and a channel effect caused by the structure of the speaker module respectively. The speaker amplifier 120 is for receiving the audio input, compensating the audio input according to the first peak and/or the second peak, and producing an audio output to the speaker module 130. The speaker amplifier 120 amplifies and modulates the input signal Sin based on the first peak and/or the second peak to solve resonance frequency degradation issue caused by the porous material. FIG. 2 shows a sectional view of a portable device 200 according to an embodiment. The portable device 200 comprises a CPU 210, a speaker amplifier 220, a speaker module 230 and a housing 240. The housing 240 for the portable device 200 comprises an audio output port 244. The speaker module 230 is provided internal to the housing 240 and disposed in a side 250 of the housing 240. The speaker module 230 comprises a speaker unit 234, a channel 236, a back chamber 238, and a front chamber 242. The front chamber 242 is a first acoustic chamber 242 internal to the housing 240 and defined by a front sidewall, having a first exit opening 232 proximate to the audio output port 244. The speaker unit 234 is provided in or coupled to the first acoustic chamber 242, for producing audible sounds. Further, the speaker unit 234 is disposed and fixed within the first acoustic chamber 242. The speaker unit 234 comprises a front side adjacent to the first existing opening 232 for producing audible sounds and a backside separate from the front side for boosting sound resonance. The back chamber 238 is a second acoustic chamber 238 internal to the housing 240 and defined by a rear sidewall. The channel 236 is joined to and elongated between the first acoustic chamber 242 and the second acoustic chamber 238, and is further disposed between the speaker unit 234 and the second acoustic chamber 238, wherein a cross sectional area of the channel 236 (taken along a direction shown as line A) is smaller than a cross sectional area of the second acoustic chamber 238 (taken along the same first direction shown as line B), i.e. the channel 236 is narrower that the second acoustic chamber 238. The channel 236 comprises a first communication opening joined to the first acoustic chamber 242 by connecting through a portion of the front side wall adjacent to the backside of the speaker unit 234 and a second communication opening joined to the second acoustic chamber 238 by connecting through the rear side wall. The channel 236 will cause a channel effect to decrease the low frequency component and caused a response drop at/around a standing wave frequency for the output signal Sout. To relief the channel effect, a porous material is filled inside at least a portion of the first acoustic chamber 242, the second acoustic chamber 238, and/or the channel 236, for improving and extending bass performance and relieving the response drop around the standing wave frequency. Furthermore, it is noted that the second acoustic chamber 238 or the channel 236 is filled with a porous material PM partially or completely, i.e. bass extension material, such as N'Bass™ dbass, carbon, powder, sponge and so on, wherein a fill rate of the porous material PM is determined according to actual application.

Figure 3A:
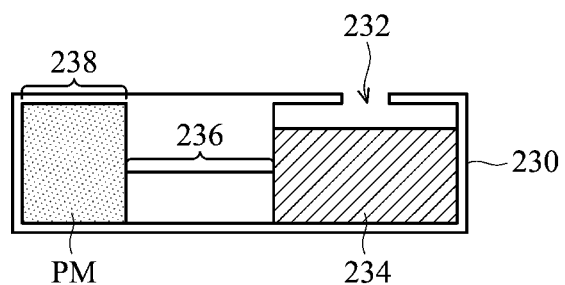
FIG. 3A shows a schematic diagram illustrating a 50% fill rate of the porous material PM disposed in the speaker module of FIG. 2.
Figure 3B:
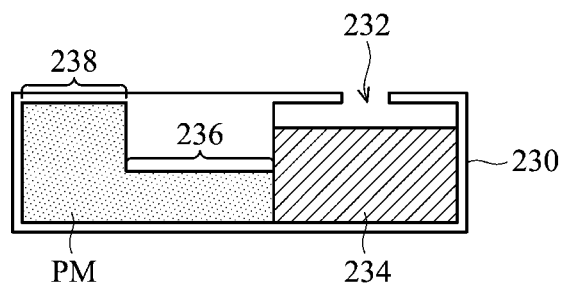
FIG. 3B shows a schematic diagram illustrating a 100% fill rate of the porous material PM disposed in the speaker module of FIG. 2.

FIGS. 3A and 3B show schematic diagrams illustrating various fill rates of the porous material PM disposed in the speaker module 230 of FIG. 2. In FIG. 3A, a 50% fill rate of the porous material PM is shown. In the embodiment, the second acoustic chamber 238 is completely filled with the porous material PM, and no porous material PM is disposed in the channel 236. In FIG. 3B, a 100% fill rate of the porous material PM is shown. In the embodiment, the second acoustic chamber 238 and the channel 236 are completely filled with the porous material PM.

Figure 4A:
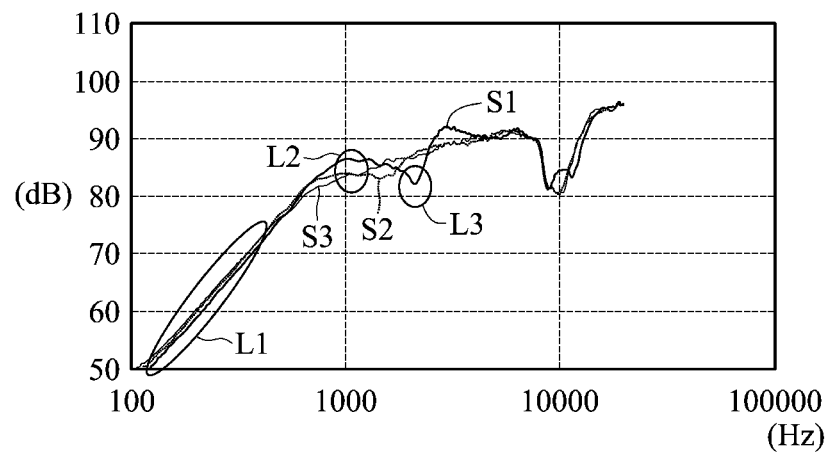
FIG. 4A shows a frequency characteristic chart illustrating differences between a speaker module without porous material and a speaker module with the porous material PM according to an embodiment of this application.
Figure 4B:
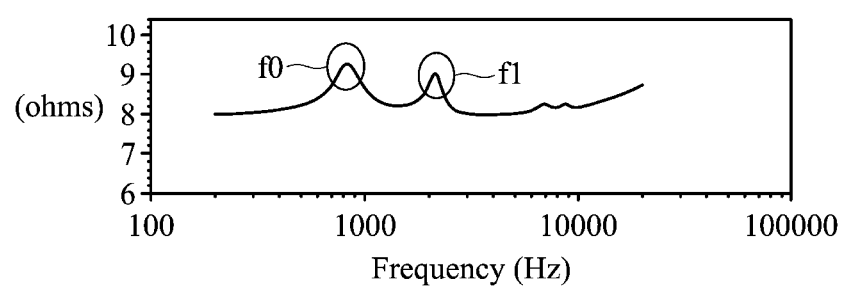
FIG. 4B shows an impendence characteristic chart illustrating the impendence characteristic corresponding to the frequency characteristic of FIG. 4A.

FIG. 4A shows a frequency characteristic chart illustrating differences between a speaker module without porous material and a speaker module with the porous material PM according to an embodiment of this application. FIG. 4B shows an impendence characteristic chart illustrating the impendence characteristic corresponding to the frequency characteristic of FIG. 4A. In FIG. 4A, the curve S1 represents the simulation result without porous material. Specifically, no porous material is disposed in the speaker module 230 of FIG. 2. The curve S2 represents the simulation result with a 50% porous material, as shown in FIG. 3A. The curve S3 represents the simulation result with a 100% porous material, as shown in FIG. 3B. It is noted that a response drop occurs at a standing wave frequency. Compared with the curve S1, the low frequency performance is extended/improved for the curve S2 and the curve S3, as shown in label L1. Moreover, the response drop caused by the channel effect is at least relieved in the curve S2 and even eliminated in the curve S3. By using the porous material PM in the speaker module 230, bass performance is improved. Furthermore, impact caused by the standing wave effect in addition to the bass extension is also decreased. However, sound pressure level (SPL) around the resonance frequency is degraded. In FIG. 4A, label L2 shows that the resonance frequency has been degraded, and label L3 shows the standing wave effect. In response to the degraded resonance frequency and the standing wave effect, two peaks f0 and fs occur in the impendence chart of FIG. 4B.

Figure 5:
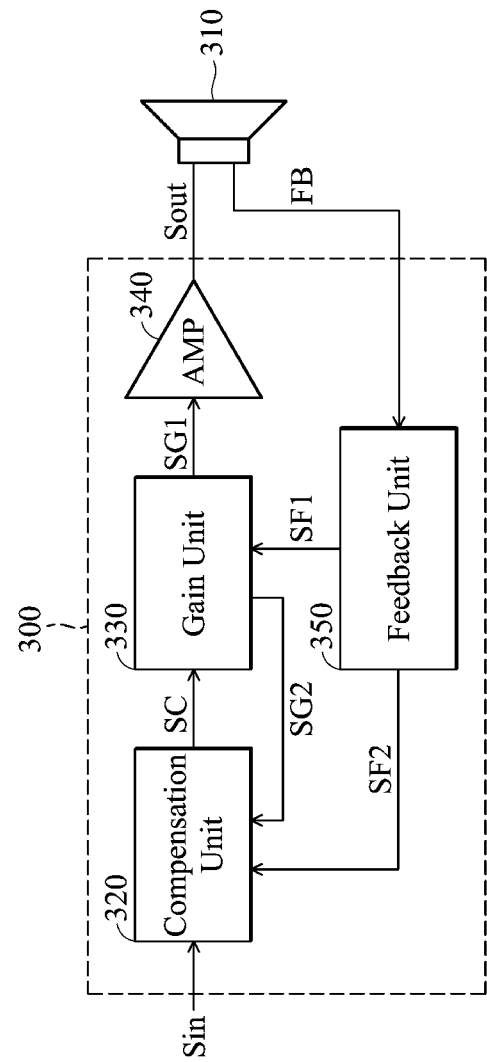
FIG. 5 shows an amplifier for increasing SPL around the resonance frequency according to an embodiment of this application.
Figure 6:
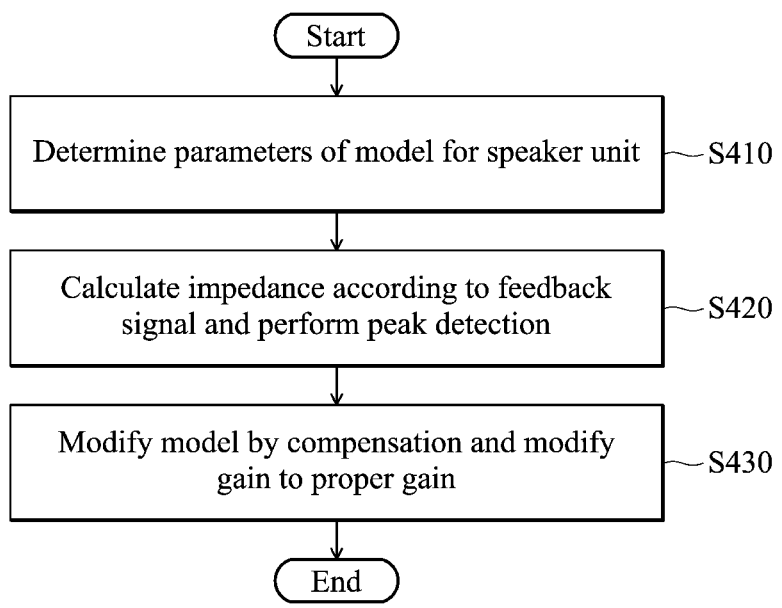
FIG. 6 shows a processing method for the amplifier of FIG. 5 according to an embodiment of this application.

FIG. 5 shows a speaker amplifier 300 for increasing SPL around the resonance frequency according to an embodiment of this application. The speaker amplifier 300 receives an input signal Sin from a CPU (e.g. 110 of FIG. 1) and provides an output signal Sout to a speaker unit 310 of a speaker module (e.g. 230 of FIG. 2) for producing audible sound, wherein the CPU provides the input signal Sin according to a multi-media file stored in a portable device or from an external device. The speaker amplifier 300 comprises a compensation unit 320, a gain unit 330, an amplifier 340 and a feedback unit 350. The feedback unit 350 is coupled to the speaker unit 310, for receiving a feedback signal from the speaker unit 310 corresponding to the playing of a media file or impedance characteristic of the audio input, and for detecting an excursion of the speaker unit based on the feedback signal. Furthermore, the feedback unit 350 calculates the feedback signal and detects an impedance curve, a first peak, and/or a second peak of the calculated impedance curve. The first peak is detected and calculated in response to a resonance frequency of the impedance curve corresponding to the feedback signal, and the second peak is detected and calculated in response to a standing wave frequency of the impedance curve corresponding to the feedback signal. The first peak is caused by the porous material wherein resonance degradation is caused at/around a resonance frequency. The second peak is caused by the channel wherein the standing wave effect is caused at/around a standing wave frequency. Moreover, the standing wave effect is offseted simultaneously by a response enhancement contributing to the porous material around the standing wave frequency. In some embodiment, the standing wave frequency is further shifted contributed to fill-in arrangement of the porous material. The compensation unit 320 is for receiving the audio input and outputting compensated signals accordingly by performing look-ahead based compensation according to the first peak and/or the second peak. Further, the compensation unit 320 compensates the input signal Sin according to a signal SF2 from the feedback unit 350 and a signal SG2 from the gain unit 330, to provide a signal SC to the gain unit 330. The gain unit 330 adjusts a gain value of the signal SC instantly according to a signal SF1 from the feedback unit 350, to provide a signal SG1 to the amplifier 340. The feedback unit 350 detects a deviation of an excursion of the speaker unit, and the gain unit 330 instantly adjust its gain value to correct the excursion of the speaker unit 310 based on the detected excursion of the speaker unit. The amplifier 340 amplifies the signal SG1 to provide the output signal Sout to the speaker unit 310. In FIG. 5, the feedback unit 350 generates the signals SF1 and SF2 according to a feedback signal FB corresponding to the output signal Sout from the speaker unit 310. FIG. 6 shows a processing method for the speaker amplifier 300 of FIG. 5 according to an embodiment of this application. Referring to FIG. 5 and FIG. 6 together, first, in step S410, the predicted parameters of a model are determined by the compensation unit 320 and the gain unit 330 for the speaker unit 310. Thus, the amplifier 340 provides the output signal Sout corresponding to the model to the speaker unit 310. Next, in step S420, the feedback unit 350 receives the feedback signal FB corresponding to the model to calculate impedance, and then performs peak detection to obtain a peak f0 and a peak fs for the calculated impedance, wherein the peak f0 is detected in response to a resonance frequency of the feedback signal FB, and the peak fs is detected in response to a standing wave of the feedback signal FB, as shown in FIG. 4B. Furthermore, the feedback unit 350 provides the signals SF1 and SF2 to the gain unit 330 and the compensation unit 320 according to the peaks f0 and fs. Next, in step S430, the model is modified by the compensation unit 320 and the gain unit 330 according to the signals SF1 and SF2. For example, the compensation unit 320 modifies the model by compensation in response to the signal SF2, and the gain unit 330 modifies the gain thereof to a proper gain in response to the signal SF1 until the model is optimized for the speaker unit 310.

Figure 7:
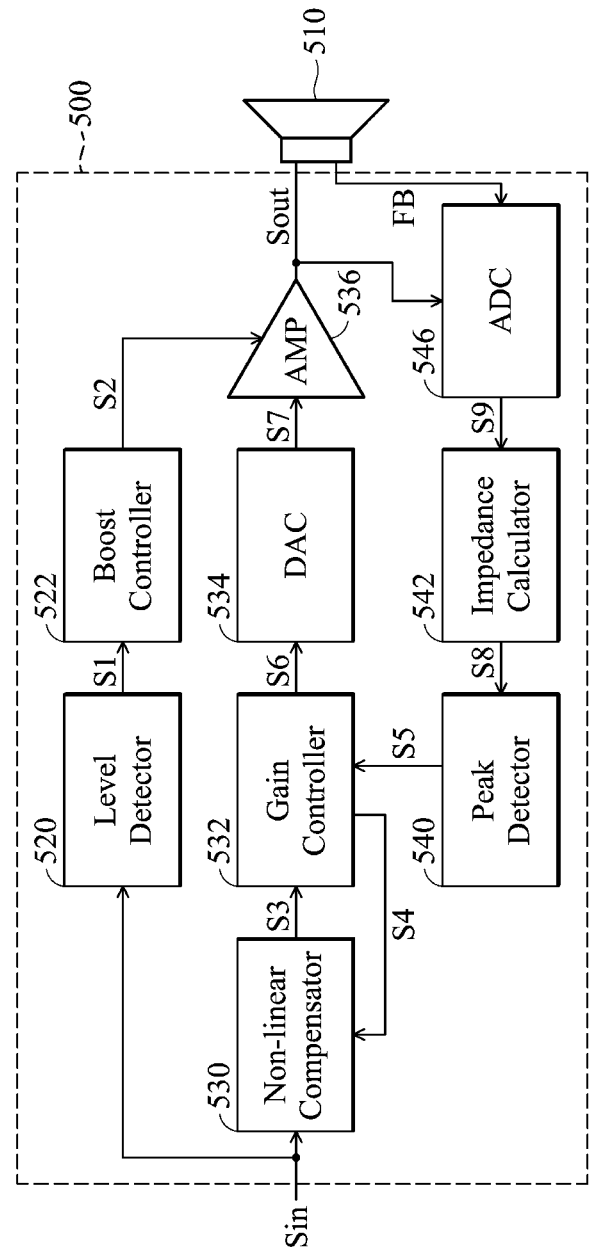
FIG. 7 shows a speaker amplifier for increasing SPL around the resonance frequency according to another embodiment of this application.

FIG. 7 shows a speaker amplifier 500 for increasing SPL around the resonance frequency according to another embodiment of this application. The speaker amplifier 500 receives an input signal Sin from a CPU (e.g. 110 of FIG. 1) and provides an output signal Sout to a speaker unit 510 of a speaker module (e.g. 230 of FIG. 2) for playing audible sound, wherein the CPU provides the input signal Sin according to a multi-media file stored in a portable device or from an external device. The speaker amplifier 500 comprises a level detector 520, a boost controller 522, a non-linear compensator 530, a gain controller 532, a digital to analog converter (DAC) 534, an amplifier 536, a peak detector 540, an impedance calculator 542 and an analog to digital converter (ADC) 546. In FIG. 7, the level detector 520 detects a voltage level of the input signal Sin to provide a signal S1. According to the signal S1, the boost controller 522 provides a signal S2 to control a gain of the amplifier 536. Furthermore, the non-linear compensator 530 compensates the input signal Sin according to a signal S4 from the gain controller 532, to provide a signal S3 to the gain unit 532. The gain unit 532 modifies a gain of the signal S3 according to a signal S5 from the peak detector 540, to provide a signal S6 to the DAC 534. The DAC 534 converts the signal S6 to generate a signal S7. Next, the amplifier 536 amplifies the signal S7 according to the signal S2, to provide the output signal Sout to the speaker unit 510. Simultaneously, the amplifier 536 provides the output signal Sout to ADC 546. The ADC 546 converts a feedback signal FB corresponding to the output signal Sout from the speaker unit 510, to generate a signal S9. Next, the impedance calculator 542 calculates the impedance according to the signal S9, to obtain a signal S8. The peak detector 540 performs peak detection for the signal S8, so as to obtain a peak f0 and a peak fs, wherein the peak f0 is detected in response to a resonance frequency of the feedback signal FB, and the peak fs is detected in response to a standing wave of the feedback signal FB, as described above. Next, the peak detector 540 provides the signal S5 to the gain unit 532 according to the peaks f0 and fs. In response to the signal S5, the gain controller 532 modifies the gain thereof to a proper gain for the signal S3, and the gain controller 532 further provides the signal S4 to the non-linear compensator 530. In response to the signal S4, the non-linear compensator 530 compensates the input signal Sin to generate the signal S3. Thus, the degraded resonance frequency caused by the porous material PM is boosted back to the original SPL level.

Figure 8:
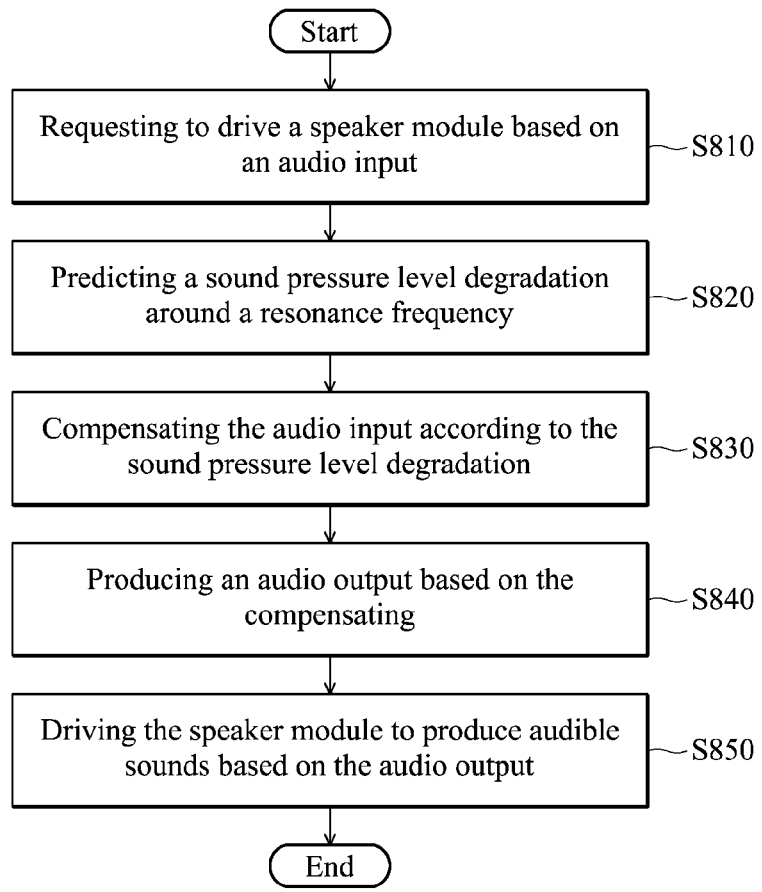
FIG. 8 shows a method for operating a portable electronic device of FIG. 1.

FIG. 8 shows a method for operating a portable electronic device 100 of FIG. 1. Referring to FIGS. 1-2, 5 and 8 together. The portable electronic device 100 having a speaker module 130 at least partially filled with a porous material, wherein the speaker module 130 is configured to produce audible sound and comprises a channel 236 for passing the audible sound. In step 810, the CPU 110 requests to drive the speaker module 130 based on an audio input (Sin). In step 820, the speaker amplifier 120 predicts a sound pressure level degradation around a resonance frequency caused by the porous material. Specifically, the feedback unit 350 receives a feedback signal and detects an excursion of the speaker module 130 during the driving of the speaker module 130 based on the feedback signal. Furthermore, the feedback unit 350 calculates the sound pressure level degradation based on the detected excursion. The sound pressure level degradation is indicated by a first peak corresponding to a resonance frequency and/or a second peak corresponding to a standing wave frequency, and the first and second peaks are caused by the porous material and the channel respectively or jointly. In step 830, the speaker amplifier 120 compensates the audio input according to the sound pressure level degradation by performing look-ahead based inverse compensation. In step 840, the speaker amplifier 120 produces an audio output to drive the speaker module 130 based on the compensating. In step 850, the speaker amplifier 120 drives the speaker module to produce audible sounds based on the audio output.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
   a housing for the portable electronic device, the housing including an audio output port;
   a first acoustic chamber internal to the housing and defined by a front sidewall, having a first exit opening proximate to the audio output port;
   a speaker unit provided in or coupled to the first acoustic chamber, for producing audible sounds;
   a second acoustic chamber internal to the housing and defined by a rear sidewall;
   a channel joined to and elongated between the first acoustic chamber and the second acoustic chamber; and
   a porous material filled inside at least a portion of the first acoustic chamber, the second acoustic chamber, or the channel,
   wherein the first acoustic chamber is separate from the second acoustic chamber by the channel, and a cross sectional area of the channel is smaller than that of the second acoustic chamber.

2. The portable electronic device as claimed in claim 1, wherein the speaker unit comprises a front side adjacent to the first existing opening for producing audible sounds and a backside separate from the front side for boosting sound resonance.

3. The portable electronic device as claimed in claim 1, wherein the channel comprises a first communication opening joined to the first acoustic chamber by connecting through a portion of the front side wall adjacent to the backside of the speaker unit and a second communication opening joined to the second acoustic chamber by connecting through the rear side wall.

4. The portable electronic device as claimed in claim 1, wherein the porous material is capable of improving and extending bass performance and relieving a channel effect caused by the channel.

5. A portable electronic device, comprising:
a housing having an audio output opening;
a speaker module provided internal to the housing, the speaker module including at least:
a first acoustic chamber provided internal to the housing; a speaker unit disposed within the first acoustic chamber;
a second acoustic chamber internal to the housing;
a channel joined between the first acoustic chamber and the second acoustic chamber; and
a porous material filled inside at least a portion of the first acoustic chamber, the second acoustic chamber, or the channel, for improving and extending bass performance;
at least one memory, for storing a multimedia file, a first peak corresponding to a resonance frequency or a second peak corresponding to a standing wave frequency;
a central processing unit, for playing the multimedia file to producing an audio input corresponding the playing of the multimedia file; and
a speaker amplifier, for receiving the audio input, compensating the audio input according to the first peak or the second peak, and producing an audio output to the speaker module.

6. The portable electronic device as claimed in claim 5, wherein the speaker amplifier further comprises: a feedback unit coupled to the speaker unit, for receiving a feedback signal and detecting an excursion of the speaker unit based on the feedback signal.

7. The portable electronic device as claimed in claim 5, wherein the speaker amplifier further comprises:

a compensation unit, for receiving the audio input and outputting compensated signals accordingly by performing look-ahead based compensation according to the first peak or the second peak.

8. The portable electronic device as claimed in claim 6, wherein the feedback unit calculates the feedback signal and detects an impedance curve, the first peak, or the second peak of the calculated impedance curve.

9. The portable electronic device as claimed in claim 6, wherein the first peak is detected in response to a resonance frequency of the feedback signal, and the second peak is detected in response to a standing wave frequency of the feedback signal.

10. A method for operating a portable electronic device having a speaker module at least partially filled with a porous material, wherein the speaker module is configured to produce audible sound and comprises a channel for passing the audible sound, the method comprising:
requesting to drive the speaker module based on an audio input;
predicting a sound pressure level degradation around a resonance frequency caused by the porous material;
compensating the audio input according to the predicting by performing look-ahead based inverse compensation;
producing an audio output based on the compensating; and
driving the speaker module to produce audible sounds based on the audio output.

11. The method as claimed in claim 10, further comprises:
receiving a feedback signal;
detecting an excursion of the speaker module during the driving of the speaker module based on the feedback signal;
calculating the sound pressure level degradation based on the detected excursion; and
compensating the audio input according to the sound pressure level degradation.

12. The method as claimed in claim 10, wherein the sound pressure level degradation is indicated by a first peak corresponding to a resonance frequency or a second peak corresponding to a standing wave frequency, and the first and second peaks are caused by the porous material and the channel respectively.

* * * * *